US012640575B2

(12) United States Patent
Chen et al.

(10) Patent No.: US 12,640,575 B2
(45) Date of Patent: May 26, 2026

(54) CIRCUIT FOR MANAGING POWER PROVIDED BY A BATTERY IN AN ELECTRIC DEVICE

(71) Applicant: SHENZHEN SHOKZ CO., LTD., Shenzhen (CN)

(72) Inventors: Yunbin Chen, Shenzhen (CN); Fen You, Shenzhen (CN); Xiao Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 916 days.

(21) Appl. No.: 17/809,010

(22) Filed: Jun. 27, 2022

(65) Prior Publication Data

US 2022/0337075 A1     Oct. 20, 2022

Related U.S. Application Data

(63) Continuation of application No. PCT/CN2020/089201, filed on May 8, 2020.

(51) Int. Cl.
*H02J 7/00*     (2026.01)
*H02J 7/61*     (2026.01)
(Continued)

(52) U.S. Cl.
CPC ............... *H02J 7/855* (2026.01); *H02J 7/61* (2026.01); *H02J 7/62* (2026.01); *H02J 7/63* (2026.01); *H02J 7/80* (2026.01)

(58) Field of Classification Search
CPC ...................................................... H02J 7/0063
(Continued)

(56) References Cited

U.S. PATENT DOCUMENTS

2005/0134230 A1     6/2005  Sato et al.
2018/0006475 A1*    1/2018  Huang .................. H01M 10/44
(Continued)

FOREIGN PATENT DOCUMENTS

CN      101404406 A      4/2009
CN      105048606 A      11/2015
(Continued)

OTHER PUBLICATIONS

International Search Report in PCT/CN2020/089201 mailed on Feb. 8, 2021, 5 pages.
(Continued)

*Primary Examiner* — Yalkew Fantu
(74) *Attorney, Agent, or Firm* — METIS IP LLC

(57) ABSTRACT

The present disclosure relates to a power management circuit of an electronic device. The circuit may include a battery configured to provide a variable current to drive a load device, and a processing circuit electrically connected to the battery via a wire. The processing circuit may be configured to detect a voltage applied on the processing circuit, and power off the load device in response to a detection that the voltage applied on the processing circuit is smaller than a threshold value. The voltage applied on the processing circuit may depend on a cell voltage of the battery, and a voltage drop caused by the variable current and a resistance deriving from the battery and the wire. A change of the voltage applied on the processing circuit may lag behind a change of the variable current.

20 Claims, 6 Drawing Sheets

<u>100</u>

(51) Int. Cl.
   *H02J 7/62*          (2026.01)
   *H02J 7/63*          (2026.01)
   *H02J 7/80*          (2026.01)

(58) Field of Classification Search
   USPC ......................................................... 320/116
   See application file for complete search history.

(56)                    References Cited

U.S. PATENT DOCUMENTS

| | | | | |
|---|---|---|---|---|
| 2019/0148963 A1* | 5/2019 | Nakao | ..................... | B60L 50/66 |
| | | | | 320/134 |
| 2019/0312511 A1* | 10/2019 | Crossley | ................. | H02M 1/14 |
| 2020/0295660 A1* | 9/2020 | Oguma | ................... | H02J 7/342 |
| 2020/0411872 A1* | 12/2020 | Han | .......................... | C08L 9/08 |

FOREIGN PATENT DOCUMENTS

| | | | |
|---|---|---|---|
| CN | 205195249 | U | 4/2016 |
| CN | 205544488 | U | 8/2016 |
| CN | 206524621 | U | 9/2017 |
| CN | 107733031 | A | 2/2018 |
| CN | 208094170 | U | 11/2018 |
| EP | 1278285 | A1 | 1/2003 |

OTHER PUBLICATIONS

Written Opinion in PCT/CN2020/089201 mailed on Feb. 8, 2021, 4 pages.
First Office Action in Chinese Application No. 202080096668.4 mailed on Oct. 28, 2025, 23 pages.

* cited by examiner

<u>100</u>

<u>240</u>

500

600

CIRCUIT FOR MANAGING POWER PROVIDED BY A BATTERY IN AN ELECTRIC DEVICE

CROSS-REFERENCE TO RELATED APPLICATIONS

This application is a continuation of International Application No. PCT/CN2020/089201, filed on May 8, 2020, the contents of which are hereby incorporated by reference.

TECHNICAL FIELD

The present disclosure generally relates to a circuit for power management in an electronic device, and specifically, to a circuit for managing the power provided by a battery in the electronic device.

BACKGROUND

With the development of science and technology, electronic devices are used more and more widely in people's life. Generally, an electronic device (e.g., a wireless headphone, a mobile phone, smart glasses, etc.) carries a battery to provide power, so that it can be used by a user at any time. In some occasions, a forced shutdown of the electronic device may occur once the battery power is exhausted or approximately exhausted, thus causing damage to the battery. Additionally, the forced shutdown of the electronic device also causes bad experience to the user. Thus, it is desirable to provide a circuit for better managing the power provided by the battery and improving the user experience of the electronic device.

SUMMARY

According to a first aspect of the present disclosure, a circuit for avoiding an electronic device from powering off due to a large consumption current of the electronic device is provided. The circuit may include a battery configured to provide a consumption current to drive a load device. The circuit may include a protection circuit electrically connected to the battery and configured to protect the battery from an abnormal condition. The circuit may further include a processing circuit electrically connected to the battery via a wire. The processing circuit may be configured to detect a voltage applied on the processing circuit, and power off the load device in response to a detection that the voltage applied on the processing circuit is smaller than a threshold value. The voltage applied on the processing circuit may depend on a cell voltage of the battery, and a voltage drop caused by the consumption current and a resistance deriving from the battery, the protection circuit, and the wire.

In some embodiments, the cell voltage of the battery may vary with a capacity percentage of the battery.

In some embodiments, the resistance deriving from the battery may include a first resistance. The first resistance may be less than 200 mΩ.

In some embodiments, the resistance deriving from the protection circuit may include a second resistance. The second resistance may be within 10 mΩ to 50 mΩ.

In some embodiments, the resistance deriving from the wire may include a third resistance. The third resistance may be less than 0.5 Ω/m.

In some embodiments, the wire may be coated with tin or silver.

In some embodiments, a diameter of the wire may be within 0.1 mm to 0.5 mm.

In some embodiments, the load device may include an electroacoustic element.

In some embodiments, the abnormal condition may include at least one of an overcharge of the battery, an over discharge of the battery, or an overcurrent of the battery.

According to a second aspect of the present disclosure, an electronic device including a circuit for avoiding an electronic device from powering off due to a large consumption current of the electronic device is provided. The circuit may include a battery configured to provide a consumption current to drive a load device. The circuit may include a protection circuit electrically connected to the battery and configured to protect the battery from an abnormal condition. The circuit may further include a processing circuit electrically connected to the battery via a wire. The processing circuit may be configured to detect a voltage applied on the processing circuit, and power off the load device in response to a detection that the voltage applied on the processing circuit is smaller than a threshold value. The voltage applied on the processing circuit may depend on a cell voltage of the battery, and a voltage drop caused by the consumption current and a resistance deriving from the battery, the protection circuit, and the wire.

According to a third aspect of the present disclosure, a circuit for avoiding an electronic device from powering off due to a large consumption current of the electronic device is provided. The circuit may include a battery configured to provide a variable current to drive a load device. The circuit may further include a processing circuit electrically connected to the battery via a wire. The processing circuit may be configured to detect a voltage applied on the processing circuit, and power off the load device in response to a detection that the voltage applied on the processing circuit is smaller than a threshold value. The voltage applied on the processing circuit may depend on a cell voltage of the battery, and a voltage drop caused by the variable current and a resistance deriving from the battery and the wire. A change of the voltage applied on the processing circuit may lag behind a change of the variable current.

In some embodiments, the processing circuit may include a voltage detection unit to detect the voltage applied on the processing circuit. The circuit may further include a capacitor and a resistor. A first end of the resistor may be electrically connected to an input end of the processing circuit and a second end of the resistor may be electrically connected to the capacitor. The voltage detection unit may be electrically connected to a point between the resistor and the capacitor.

In some embodiments, a lag time may be correlated with a product of a resistance of the resistor and a capacitance of the capacitor.

In some embodiments, the circuit may include a capacitor and a diode. An anode of the diode may be electrically connected to the load device and a cathode of the diode may be electrically connected to the processing circuit. The capacitor may be electrically connected to the cathode of the diode. The processing circuit may be electrically connected to a point between the diode and the capacitor to detect the voltage applied on the processing circuit.

In some embodiments, a lag time may be correlated with a capacitance of the capacitor.

In some embodiments, the load device may include an electroacoustic element.

According to a fourth aspect of the present disclosure, an electronic device including a circuit for avoiding an electronic device from powering off due to a large consumption current of the electronic device is provided. The circuit may include a battery configured to provide a variable current to drive a load device. The circuit may further include a processing circuit electrically connected to the battery via a wire. The processing circuit may be configured to detect a voltage applied on the processing circuit, and power off the load device in response to a detection that the voltage applied on the processing circuit is smaller than a threshold value. The voltage applied on the processing circuit may depend on a cell voltage of the battery, and a voltage drop caused by the variable current and a resistance deriving from the battery and the wire. A change of the voltage applied on the processing circuit may lag behind a change of the variable current.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
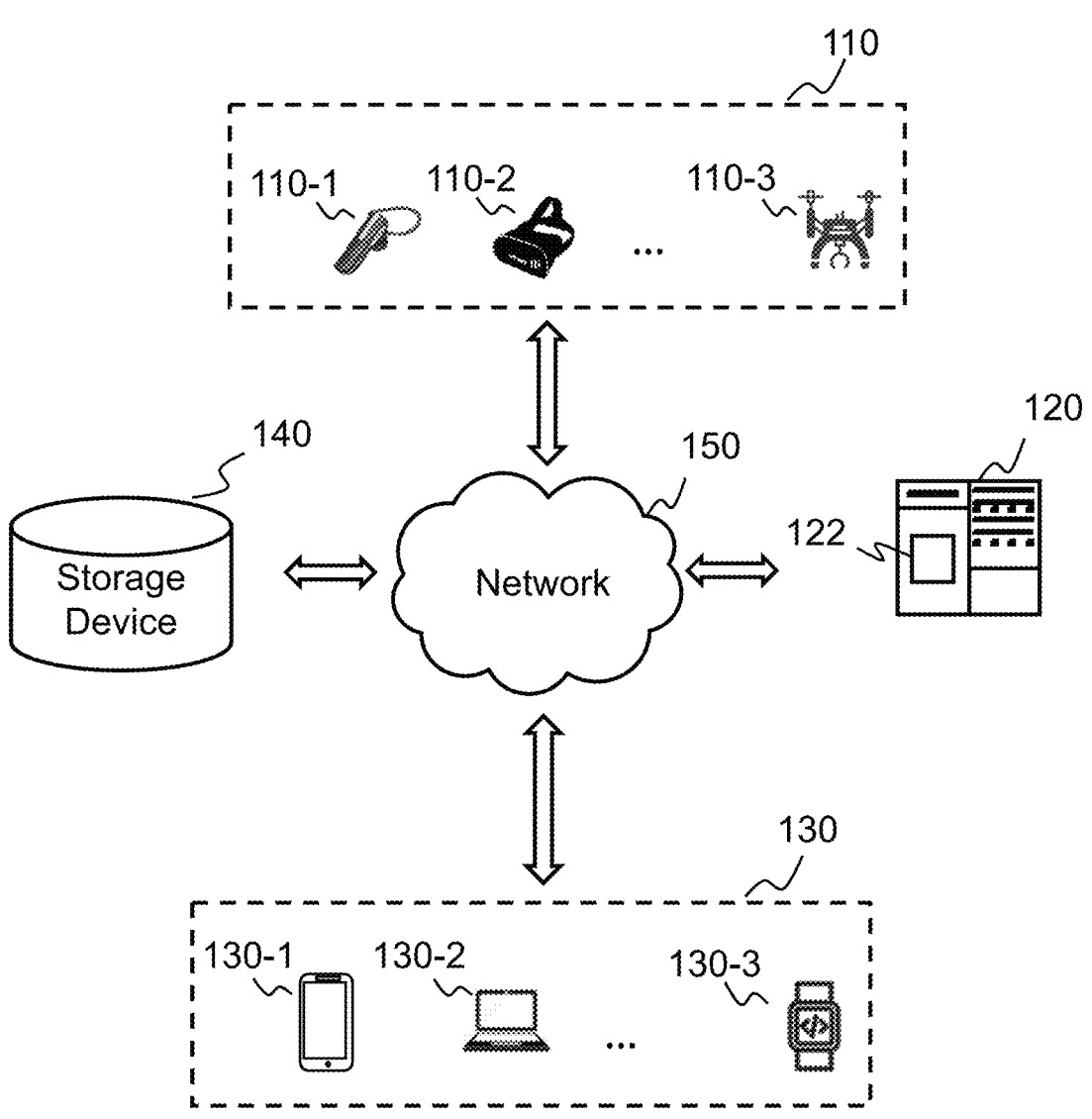
FIG. 1 is a schematic diagram illustrating an exemplary power management system 100 according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

In one aspect of the present disclosure, a circuit for avoiding an electronic device from powering off due to a large consumption current of the electronic device is provided. The circuit may include a battery configured to provide a consumption current to drive a load device. The circuit may include a protection circuit electrically connected to the battery and configured to protect the battery from an abnormal condition. The circuit may further include a processing circuit electrically connected to the battery via a wire. The processing circuit may be configured to detect a voltage applied on the processing circuit, and power off the load device in response to a detection that the voltage applied on the processing circuit is smaller than a threshold value. The voltage applied on the processing circuit may depend on a cell voltage of the battery, and a voltage drop caused by the consumption current and a resistance deriving from the battery, the protection circuit, and the wire. For example, the voltage applied on the processing circuit may be equal to the difference between the cell voltage and the voltage drop. In this regards, in order to reduce the probability that the electronic device powers off due to the large consumption current of the electronic device, the resistance deriving from the battery, the protection circuit, and the wire may be set to be as small as possible, reducing the voltage drop caused thereby and making the voltage applied on the processing circuit as large as possible (e.g., as approximate as possible to the cell voltage).

In another aspect of the present disclosure, the circuit may include a battery configured to provide a variable current (also referred to as variable consumption current) to drive a load device. The circuit may further include a processing circuit electrically connected to the battery via a wire. The processing circuit may be configured to detect a voltage applied on the processing circuit, and power off the load device in response to a detection that the voltage applied on the processing circuit is smaller than a threshold value. The voltage applied on the processing circuit may depend on a cell voltage of the battery, and a voltage drop caused by the variable current and a resistance deriving from the battery and the wire.

In some embodiments, a change of the voltage applied on the processing circuit may lag behind a change of the variable current. For illustration purposes, the consumption current of the electronic device may vary at different time points (i.e., the variable current). For example, in the case that the load device is an electroacoustic element (e.g., a transducer of a headphone), the consumption current of the electronic device may increase instantaneously at one moment to volume up the output sound and decrease at the next moment to lower the output volume. According to the circuits disclosed herein, when the consumption current of the electronic device suddenly increases, the voltage applied on the processing circuit may not decrease immediately, but may decrease in a relatively slow speed, forming a delay with respect to the change of the consumption current. Then, when the consumption current of the electronic device decreases at the next moment, the voltage applied on the processing circuit may increase correspondingly. As a result, the voltage applied on the processing circuit may increase at the next moment before it drops below the threshold value, thereby avoiding the power off of the electronic device due to the sudden increase of the consumption current of the electronic device.

FIG. 1 is a schematic diagram illustrating an exemplary power management system 100 according to some embodiments of the present disclosure. The power management system 100 may include an electronic device 110, a server 120, a terminal device 130, a storage device 140, and a network 150.

The electronic device 110 may be any device powered by a battery. In some embodiments, the electronic device 110 may include a headphone 110-1, smart glasses 110-2, an unmanned aerial vehicle (UAV) 110-3, or the like, or any combination thereof. In some embodiments, the headphone 110-1 may include a circumaural headphone, a supra-aural headphone, an ear-fitting headphone, a mixed fitting pivoting earphone, an open headphone, or the like, or any combination thereof. In some embodiments, the smart glasses 110-2 may include virtual reality glasses, augmented reality glasses, glasses with headphones, or the like, or any combination thereof. For example, the virtual reality glasses and/or the augmented reality glasses may include Google™ Glasses, an Oculus Rift, a HoloLens, a Gear VR, etc.

In some embodiments, the server 120 may be a single server or a server group. The server group may be centralized (e.g., a data center) or distributed (e.g., the server 120 may be a distributed system). In some embodiments, the server 120 may be local or remote. For example, the server 120 may access information and/or data stored in the terminal device 130, and/or the storage device 140 via the network 150. As another example, the server 120 may be directly connected to the terminal device 130, and/or the storage device 140 to access stored information and/or data. In some embodiments, the server 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the server 120 may include a processing device 122. The processing device 122 may process information and/or data related to electronic device 110 described in the present disclosure. For example, the processing device 122 may communicate battery information, e.g., the service condition of the battery, the update information of the battery, with the electronic device 110 or the terminal device 130 connecting to the electronic device 110. In some embodiments, the processing device 122 may include one or more processing engines (e.g., single-core processing engine(s) or multi-core processor(s)). Merely by way of example, The processing device 122 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The terminal device 130 may be connected to the electronic device 110 via a wired or wireless connection. The terminal device 130 may receive operation information of the electronic device 110, e.g., the service condition of the battery, the working condition of one or more circuits of the electronic device 110. Exemplary service condition of the battery may include the current capacity percentage of the battery, the service life of the battery, the performance log of the battery, etc. Additionally, the terminal device 130 may send an instruction to the electronic device 110 to operate the electronic device 110 according to a user command. The instruction may, for example, switch on/off the electronic device 110, adjust the volume of the electronic device 110, etc. In some embodiments, the terminal device 130 may include a mobile device 130-1, a computer 130-2, a wearable device 130-3, or the like, or any combination thereof. In some embodiments, the mobile device 130-1 may include a smart home device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glasses, an Oculus Rift, a HoloLens, a Gear VR, etc. In some embodiments, the wearable device 130-3 may include a smart bracelet, a smart footgear, smart glasses, a smart helmet, a smart watch, smart clothing, a smart backpack, a smart accessory, or the like, or any combination thereof.

The storage device 140 may store data and/or instructions. For example, the storage device 140 may store data of a volume control instruction, a speed control instruction, audio data, etc. In some embodiments, the storage device 140 may store data obtained from the terminal device 130 and/or the electronic device 110. In some embodiments, the storage device 140 may store data and/or instructions that the server 120 may execute or use. In some embodiments, storage device 140 may include a mass storage device, a removable storage device, a volatile read-and-write memory, a read-only memory (ROM), or the like, or any combination thereof. Exemplary mass storage device may include a magnetic disk, an optical disk, solid-state drives, etc. Exemplary removable storage device may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 150 to communicate with one or more components of the power management system 100 (e.g., the electronic device 110, the server 120, and the terminal device 130). One or more components of the power management system 100 may access the data or instructions stored in the storage device 140 via the network 150. In some embodiments, the storage device 140 may be directly connected to or communicate with one or more components of the power management system 100 (e.g., the electronic device 110, the server 120, and the terminal device 130). In some embodiments, the storage device 140 may be part of the server 120.

The network 150 may facilitate exchange of information and/or data. In some embodiments, one or more components (e.g., the electronic device 110, the server 120, the terminal device 130, and the storage device 140) of the power management system 100 may transmit information and/or data to other component(s) of the power management system 100 via the network 150. In some embodiments, the network 150 may be any type of wired or wireless network, or combination thereof. Merely by way of example, the network 150 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 150 may include one or more network access points. For example, the network 150 may include wired or wireless network access points such as base stations and/or internet exchange points, through which one or more components of the power management system 100 may be connected to the network 150 to exchange data and/or information.

One of ordinary skill in the art would understand that when an element (or component) of the power management system 100 performs, the element may perform through electrical signals and/or electromagnetic signals. For example, when the electronic device 110 transmits an audio signal to the server 120, a processing circuit of the electronic device 110 may generate an electrical signal encoding the audio signal. The processing circuit of the electronic device 110 may then transmit the electrical signal to an output port. If the electronic device 110 communicates with the server 120 via a wired network, the output port may be physically connected to a cable, which further may transmit the electrical signal to an input port of the server 120. If the electronic device 110 communicates with the server 120 via a wireless network, the output port of the electronic device 110 may be one or more antennas, which convert the electrical signal to electromagnetic signal. Within the electronic device 110, when a processing circuit thereof processes an instruction, transmits out an instruction, and/or performs an action, the instruction and/or action is conducted via electrical signals. For example, when the processing circuit retrieves or saves data from a storage medium, it may transmit out electrical signals to a read/write device of the storage medium, which may read or write structured data in the storage medium. The structured data may be transmitted to the processing circuit in the form of electrical signals via a bus of the electronic device 110. Here, an electrical signal may refer to one electrical signal, a series of electrical signals, and/or a plurality of discrete electrical signals.

Figure 2:
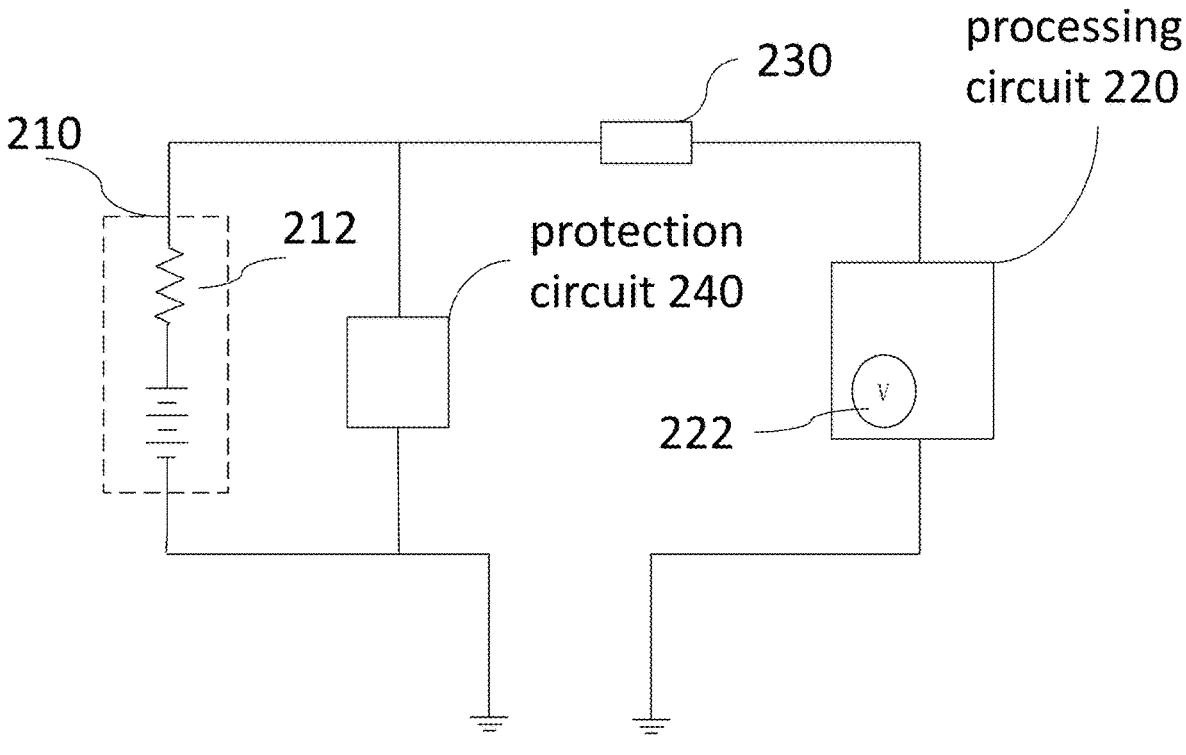
FIG. 2 is a schematic diagram illustrating an exemplary circuit of an electronic device according to some embodiments of the present disclosure.

FIG. 2 is a schematic diagram illustrating an exemplary circuit of an electronic device according to some embodiments of the present disclosure. As shown in FIG. 2, the circuit 200 may include a battery 210, a processing circuit 220, a load device 230, and a protection circuit 240.

The battery 210 may be configured to provide electric power to the processing circuit 220, the load device 230, and/or the protection circuit 240 via one or more wires. The electric power may be delivered to the exterior of the battery 210 as a current and/or a voltage. For example, the battery 210 may provide a consumption current to drive the load device 230. As another example, the battery 210 may provide a voltage to the processing circuit 220 to support the processing circuit 220 for signal processing. In some embodiments, the battery 210 may include a lithium battery, a lead-acid storage battery, a nickel-cadmium battery, a nickel-metal hydride battery, or the like, or the combination thereof. In some embodiments, the wire(s) may transmit data signals from the processing circuit 220 to the load device 230, or any other device (e.g., the terminal device 130, the storage device 140). In some embodiments, the wire(s) may be made of copper, silver, tin, aluminum, iron, nickel, zinc, or the like, or any combination thereof. For example, the wire(s) may be a copper wire coated with tin or silver.

The battery 210 may have a cell voltage which varies with a capacity percentage of the battery 210. In some occasions, the cell voltage of the battery 210 may be proportional to the capacity percentage of the battery 210. The higher the capacity percentage of the battery 510 is, the higher the cell voltage of the battery 510 may be. For example, when the capacity percentage of the battery 210 is 100%, the cell voltage of the battery 210 may be a maximum value (e.g., 4.2 V). When the capacity percentage of the battery 210 is less than 20%, the cell voltage of the battery 210 may drop to a value smaller than the maximum value (e.g., 2.5 V). The battery 210 may have an internal resistance 212 (also referred to as a first resistance) that shares part of the cell voltage when the battery 210 provides the consumption current to the load device 230. As a result, an output voltage of the battery 210 may be lower than the cell voltage of the battery 210. In some embodiments, the internal resistance 212 of the battery 210 may be dependent on the size, the chemical property, the temperature, and the discharge current (i.e., the total current flowing through the battery, which includes the consumption current in the case of FIG. 2), etc., of the battery 210.

The processing circuit 220 may control the operation of the load device. In some embodiments, the processing circuit 220 may include a voltage detection unit 222 configured to detect a voltage applied on the processing circuit 220. In some embodiments, the voltage applied on the processing circuit 220 may depend on the cell voltage of the battery 210, and a voltage drop caused by the consumption current flowing through different resistances deriving from the circuit 200 (e.g., the battery 210, the protection circuit 240, and/or the wire(s)). In some embodiments, the processing circuit 220 may power off the load device 230 in response to a detection that the voltage applied on the processing circuit 220 is smaller than a threshold value. The threshold value may be a fixed value or be associated with the cell voltage of the battery 210. For example, the threshold value may be no more than 50%, 55%, 60%, 65%, 70%, or 75% of the maximum cell voltage of the battery 210. In some embodiments, the processing circuit 220 and the load device 230 may be connected in series or in parallel.

The load device 230 may be a device that can be actuated by the electric power of the battery 210. In some embodiments, the load device 230 may include an electroacoustic element, a dynamic element, or the like, or a combination thereof. The electroacoustic element may include a transducer that produces sound. The dynamic element may include an electric motor that provides an energy of motion, or the like. The load device 230 may be integrated into different electronic devices. For example, the load device 230 may be integrated into a headphone, a mobile phone, smart glasses, an unmanned aerial vehicle, etc.

Merely by way of example, the load device 230 may be a transducer of a headphone that converts electric signals into sound signals. In this regard, the consumption current of the load device 230 may vary according to the contents the headphone is playing. For example, the headphone may need output sounds with different sound volumes (e.g., a song has different sound volumes at different moments), and thus the consumption current of the load device 230 may vary with time. The louder the output sound is, the larger the consumption current of the load device 230 may be. As another example, the load device 230 may be an electric motor that drives a device (e.g., a UAV) to move at different speeds. In such case, the higher the speed is, the larger the consumption current of the load device 230 may be.

The protection circuit 240 may be configured to protect the battery 210 from an abnormal condition. In some embodiments, the abnormal condition may include at least one of an overcharge of the battery 210, an over discharge of the battery 210, or an overcurrent of the battery 210. In some embodiments, the protection circuit 240 may include one or more components, such as a protection integrated chip (IC), one or more resistors, one or more capacitors, one or more switches, etc. As a result, in a normal working condition of the circuit 200, a second resistance may be derived from the protection circuit 240 that may share another part of the cell voltage when the battery 210 provides the consumption current to the load device 230. More descriptions regarding the structure of the protection circuit 240 may be found elsewhere in the present disclosure (e.g., FIG. 3 and the descriptions thereof).

In some embodiments, an overcurrent protection point of the protection circuit 240 may be associated with the second resistance of the protection circuit 240. As used herein, the overcurrent protection point refers to a current value above which the battery 210 may power off the load device 230. The lower the second resistance of the protection circuit 240 is, the higher the overcurrent protection point may be. That is because a current flowing through the protection circuit 240 may cause a voltage drop of the protection circuit 240 due to $$U=IR, \tag{1}$$

where U denotes the voltage drop of the protection circuit 240, I denotes the current flowing through the protection circuit 240, and R denotes the second resistance of the protection circuit 240. The protection circuit 240 may detect the voltage drop of the protection circuit 240 to determine whether the overcurrent protection point is reached. For example, the protection circuit 240 may power off the load device 230 only when a voltage drop detected by the protection circuit 240 is greater than 0.24 V. According to equation (1), a decrease in the second resistance may cause an increase in the overcurrent protection point. For example, if the second resistance is 200 mΩ, the overcurrent protection point may be determined as 1.2 A. If the second voltage of the protection circuit 240 decreases to 100 mΩ, the overcurrent protection point of the protection circuit 240 may be increased to 2.4 A.

As described above, the processing circuit 220 may power off the load device 230 when it detects that the voltage applied thereon is smaller than a threshold value. In some embodiments, in order to prevent the load device 230 from being powered off when a sudden increase in the consumption current of the load device 230 occurs (which means that the first resistance, the second resistance, etc., may share a larger amount of cell voltage, making the voltage applied on the processing circuit 220 smaller), the first resistance of the battery 210, the second resistance of the protection circuit 240, and/or the resistance of the wire(s) (also referred to as a third resistance) may be made as small as possible. In some embodiments, by selecting the material of and optimizing the structure of the battery 210, the first resistance of the battery 210 may be set to be less than 200 mΩ. For example, the first resistance of the battery 210 may be set to be less than 190 mΩ, 180 mΩ, 170 mΩ, 160 mΩ, or 150 mΩ. In some embodiments, by simplifying the circuit structure of the protection circuit 240, the second resistance of the protection circuit 240 may be set to be within 10 mΩ to 50 mΩ. For example, the second resistance may be within 15 mΩ to 45 mΩ, or within 20 mΩ to 40 mΩ, or within 25 mΩ to 35 mΩ, etc. As another example, the second resistance may be 50 mΩ, 48 mΩ, 43 mΩ, 58 mΩ, 33 mΩ, 30 mΩ, 28 mΩ, 23 mΩ, 18 mΩ, 13 mΩ, etc. In some embodiments, by selecting the material of and adjusting the configuration of the wire(s), the third resistance of the wire(s) may be set to be less than 0.8 Ω/m. For example, the wire(s) may be made of a material that is easier to conduct electricity (e.g., copper, silver) and with a thicker diameter, such that the third resistance of the wire(s) may be set to be no more than 0.7 Ω/m, 0.6 Ω/m, 0.5 Ω/m, 0.45 Ω/m, 0.4 Ω/m, 0.35 Ω/m, 0.3 Ω/m, 0.25 Ω/m, 0.2 Ω/m, etc. In some embodiments, the diameter of the wire(s) may be within 0.1 mm to 0.5 mm. For example, the diameter of the wire(s) may be 0.2 mm, 0.25 mm, 0.3 mm, 0.35 mm, 0.4 mm, 0.45 mm, etc. In some further embodiments, the third resistance of the wire(s) may be further reduced by coating with one or more layers of specific material (e.g., tin or silver).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more components may be omitted and/or one or more additional components may be added into the circuit 200. For example, the circuit 200 may include a first load device connected in series with the processing circuit 220, and a second load device connected in parallel with the processing circuit 220. As another example, the protection circuit 240 may be removed from the circuit 200.

Figure 3:
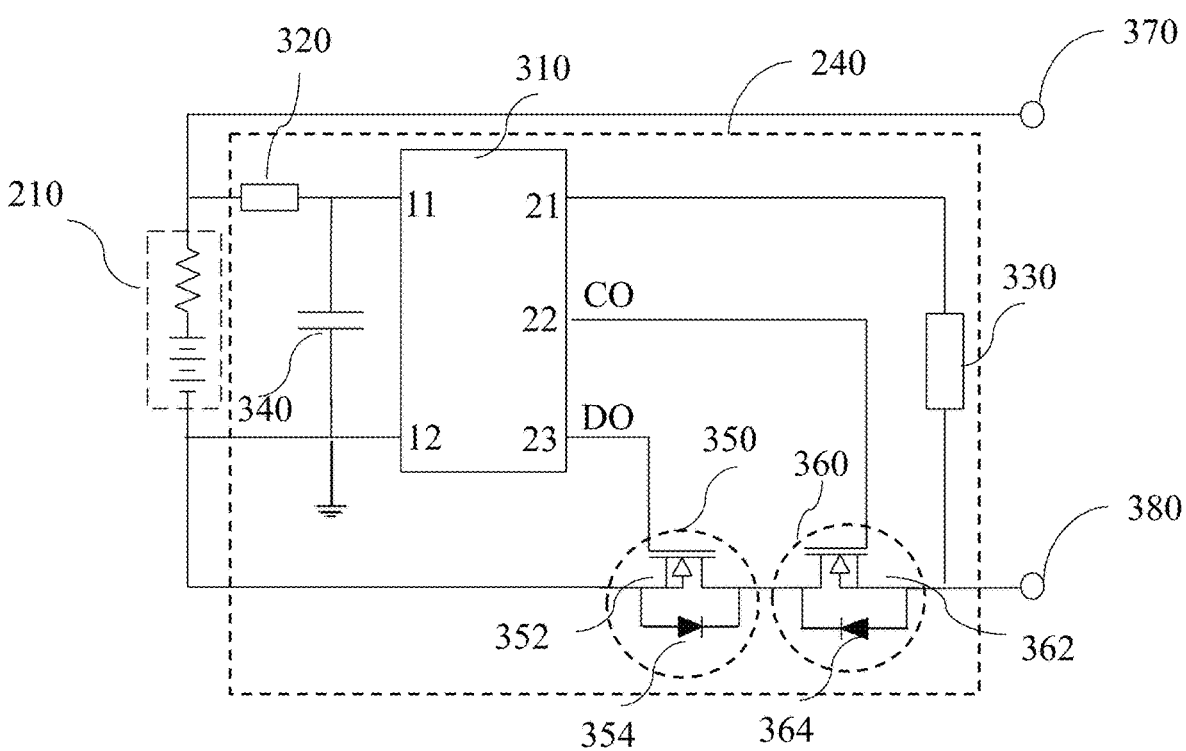
FIG. 3 is a schematic diagram illustrating an exemplary protection circuit of a battery according to some embodiments of the present disclosure.

FIG. 3 is a schematic diagram illustrating an exemplary protection circuit of a battery according to some embodiments of the present disclosure. The protection circuit 240 may be electrically connected to the battery 210 via one or more wires, and may be configured to protect the battery 210 from an abnormal condition, so as to prevent damage to the battery 210. In some embodiments, the abnormal condition may include at least one of an overcharge of the battery 210, an over discharge of the battery 210, or an overcurrent of the battery 210. As shown in FIG. 3, the protection circuit 240 may include a protection integrated chip (IC) 310, a first resistor 320, a second resistor 330, a capacitor 340, a first switching element 350, and a second switching element 360.

The protection IC 310 may be configured to detect a cell voltage and/or a cell current of the battery 210 during charging and/or discharging. The protection IC 310 may be connected to a positive electrode of the battery 210 via a first input pin 11, and connected to a negative electrode of the battery 210 via a second input pin 12 for serving as a reference point for the protection IC 310. In some embodiments, in order to filter out an interference signal of the cell voltage of the battery 210, the protection circuit 240 may further include an RC filter circuit composed of the first resistor 320 and the capacitor 340.

The protection IC 310 may be configured to control the first switching element 350 and/or the second switching element 360 based on the cell voltage and/or the cell current, thereby controlling a flow of current into and/or out of the battery 210. In some embodiments, the first switching element 350 may include a first Negative-metal-oxide-semiconductor field-effect transistor (NMOS FET) 352 and a first diode 354, and the second switching element 360 may include a second NMOS FET 362 and a second diode 364. A gate of the first switching element 350 may be connected to an over discharging control output pin 23 of the protection IC 310. A gate of the second switching element 360 may be connected to an overcharging control output pin 22. The first switching element 350 and the second switching element 360 may be connected in series between the battery 210 and the terminal 380, so that they can control the supply of power from the battery 210 to a load device (e.g., an electroacoustic element), or from a charger to the battery 210 when the battery 210 is being charged. Specifically, the first diode 354 may be forward connected between a source and a drain of the first switching element 350. Correspondingly, the second diode 364 may be forward connected between a source and a drain of the second switching element 360. In some embodiments, the protection IC 310 may further be configured to detect a discharge current of the battery 210 via an overcurrent control output pin 21. The overcurrent control output pin 21 of the protection IC 310 may be connected to one end of the second resistor 330, and another end of the second resistor 330 may be connected to the terminal 380.

During charging, a current can flow through the first switching element 350 irrespective of the value of the control signal at the gate of the first switching element 350 and the charging can be controlled by the second switching element 360. Specifically, during a charging process of the battery 210 by a charger, the cell voltage of the battery 210 may increase gradually. When the protection IC 310 detects that the cell voltage is higher than a first voltage threshold (i.e., an overcharge protection point), the protection IC 310 may send a control signal to the second switching element 360 via the overcharging control output pin 22 to turn off the second switching element 360 to disconnect the charger from the battery 210. In such a case, the battery 210 may discharge through the diode 364 until the cell voltage is equal to the voltage detected by the protection IC 310, and the second switching element 360 may be turned on.

During discharging, a current can flow through the second switching element 360 irrespective of the value of the control signal at the gate of the second switching element 360 and the discharging can be controlled by the first switching element 350. Specifically, during a discharging process of the battery 210 to a load device (e.g., the load device 230), the cell voltage of the battery 210 may decrease gradually. When the protection IC 310 detects that the cell voltage is lower than a second voltage threshold (i.e., an over discharge protection point), the protection IC 310 may send a control signal to the first switching element 350 via the over discharging control output pin 23 to turn off the first switching element 350 to disconnect the load device from the battery 210. In some embodiments, in order to prevent the battery 210 from being burned out due to excessive current (for example, when the load device is short-circuited), the protection IC 310 may detect a discharge current of the battery 210 (i.e., a total current from the terminal 370 to the terminal 380) via the overcurrent detection pin 21. When the discharge current of the battery 210 is higher than a third voltage threshold (i.e., an overcurrent protection point), the protection IC 310 may send a control signal to the first switching element 350 via the over discharging control output pin 23 to turn off the first switching element 350, so that the battery 210 may stop discharging.

Figure 4:
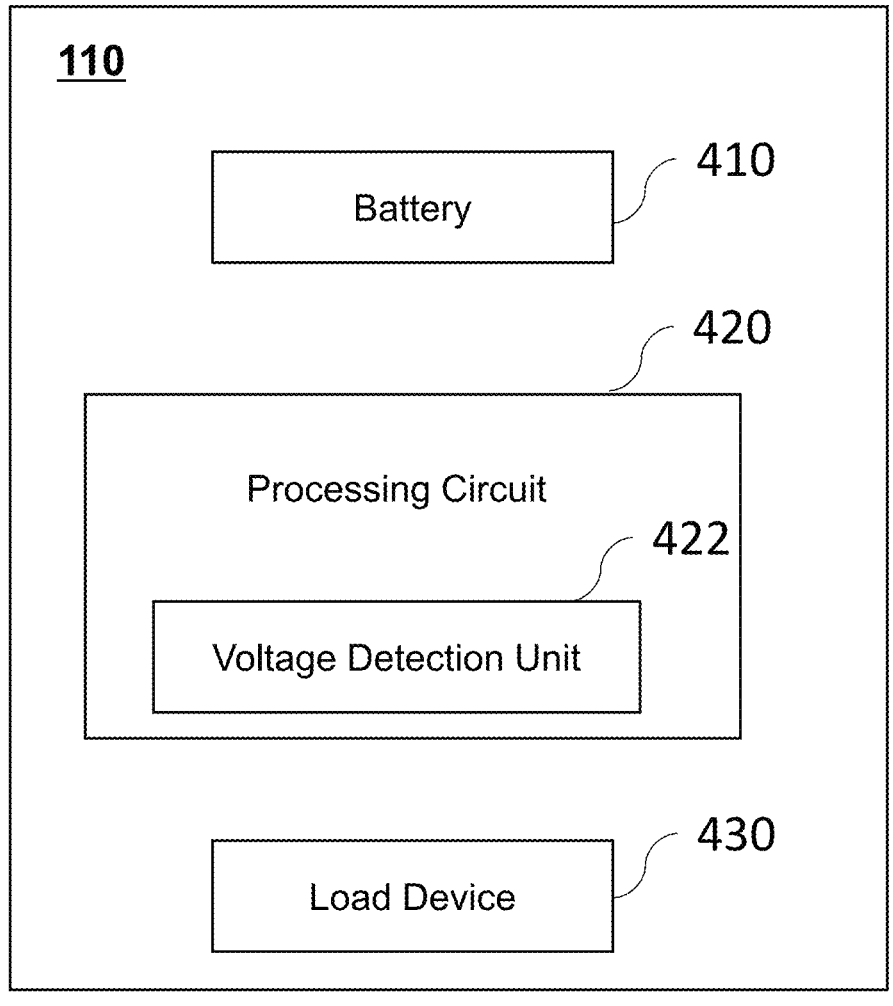
FIG. 4 is a block diagram illustrating an exemplary electronic device having a battery according to some embodiments of the present disclosure.

FIG. 4 is a block diagram illustrating an exemplary electronic device having a battery according to some embodiments of the present disclosure. As shown in FIG. 4, the electronic device 110 may include a battery 410, a processing circuit 420, and a load device 430. The processing circuit 420 and/or the load device 430 may be electrically connected to the battery 410 via one or more wires. In some embodiments, the battery 410 may be similar to or same as the battery 210 described in FIG. 2, the processing circuit 420 may be similar to or same as the processing circuit 220, and/or the load device 430 may be similar to or same as the load device 230. The one or more wires may have a resistance similar to the wire(s) described elsewhere in the disclosure.

The battery 410 may be configured to provide electric power to the processing circuit 420 and/or the load device 430 via the wire(s). For example, the battery 410 may provide a variable current (also referred to as a variable consumption current) to drive the load device 430. As another example, the battery 410 may provide a voltage to the processing circuit 420 to support the processing circuit 420 for signal processing. The battery 410 may have a cell voltage and an internal resistance. Due to the presence of the internal resistance, an output voltage of the battery 410 may be lower than the cell voltage of the battery 410. That is, the internal resistance may cause a voltage drop of the output voltage of the battery 410. More descriptions regarding the battery 410 may be found elsewhere in the present disclosure (e.g., FIG. 2 and the descriptions thereof).

The processing circuit 420 may be a circuit powered by the battery 410. The processing circuit 420 may include a voltage detection unit 422 configured to detect a voltage applied on the processing circuit 420. The voltage applied on the processing circuit 420 may depend on the cell voltage of the battery 410. The processing circuit 420 may be configured to power off the load device 430 in response to a detection that the voltage applied on the processing circuit 420 is smaller than a threshold value. For example, when the processing circuit 420 determines that the voltage detected by the voltage detection unit 422 is less than the threshold value, the processing circuit 420 may initiate a power off instruction for powering off the load device 430.

The load device 430 may receive the electric power from the battery 410. In some embodiments, the load device 430 may include an electroacoustic element, a dynamic element, or the like, or a combination thereof. In some embodiments, the load device 430 may be integrated into different electronic devices. For example, the load device 430 may be integrated into a headphone, a mobile phone, smart glasses, an unmanned aerial vehicle, etc. The load device 430 may consume a consumption current which may vary according to the purpose to be achieved by the load device 430. For example, the load device 430 may be a transducer of a headphone that consumes a consumption current to convert electric signals into sound signals according to the contents the headphone is playing. The louder the output sound is, the larger the consumption current of the load device 430 may be. As another example, the load device 430 may be an electric motor that consumes a consumption current to drive a device to move at different speeds. The higher the speed is, the larger the consumption current of the load device 430 may be.

Figure 5:
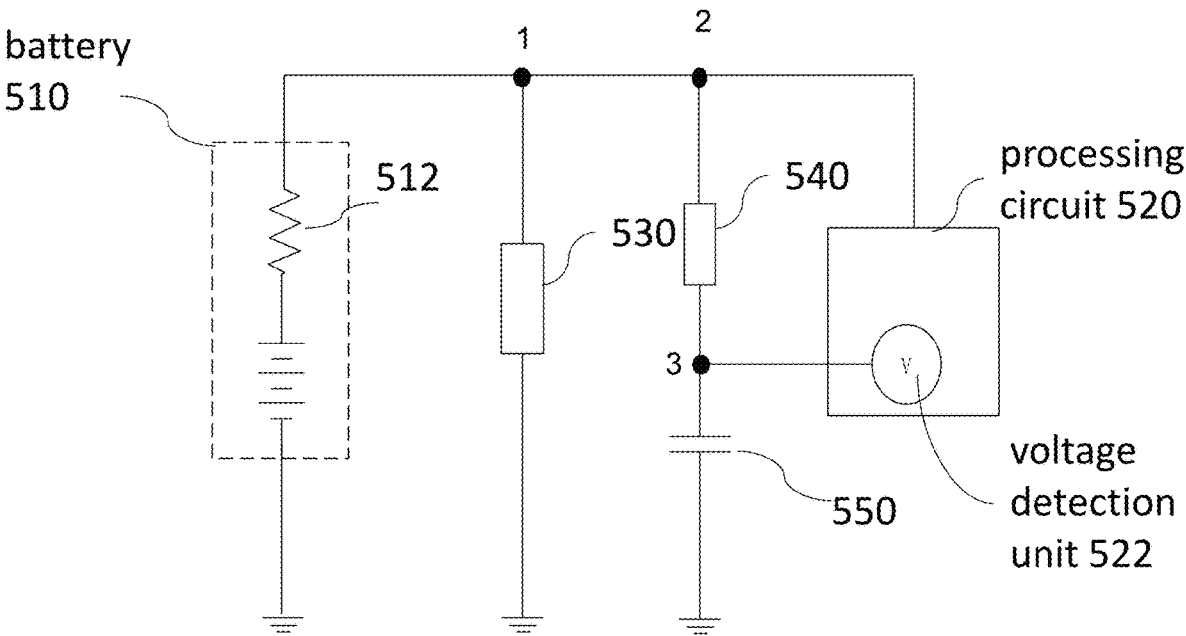
FIG. 5 is a schematic diagram illustrating an exemplary circuit of an electronic device according to some embodiments of the present disclosure.
Figure 6:
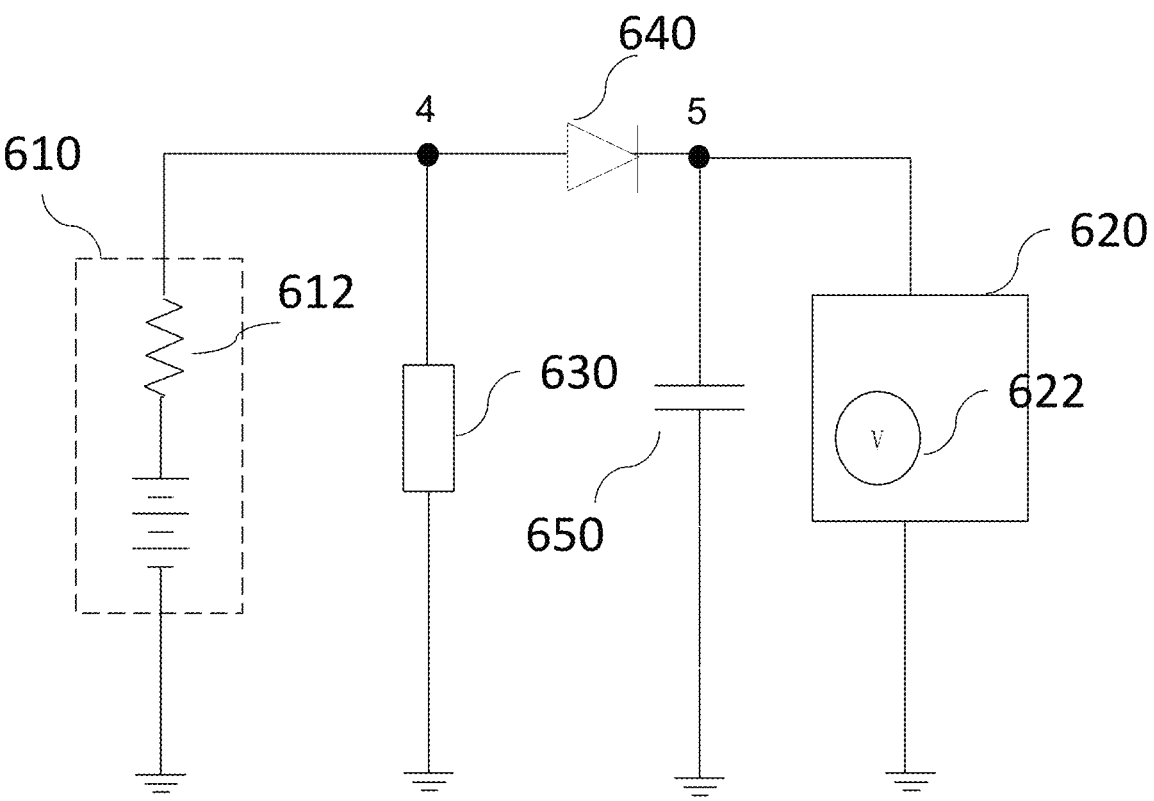
FIG. 6 is a schematic diagram illustrating an exemplary circuit of an electronic device according to some embodiments of the present disclosure.

In some embodiments, the internal resistance of the battery 410, a resistance deriving from the wire(s), and/or one or more resistances outside of the processing circuit 420 may be referred to as a consumption resistance of the electronic device 110. The consumption resistance of the electronic device 110 may share part of the cell voltage when the battery 410 provides the consumption current to the load device 430. As a result, a change of the consumption current of the load device 430 may cause a change of the voltage applied on the processing circuit 420. For example, when the consumption current of the load device 430 increases, the consumption resistance may share an increased voltage from the cell voltage, causing a voltage drop of the voltage applied on the processing circuit 420. In some embodiments, the voltage drop of the voltage of the processing circuit 420 may cause the voltage applied on the processing circuit 420 smaller than the threshold value, thereby causing the processing circuit 420 to power off the load device 430. For example, when the capacity percentage of the battery 410 is low (e.g., less than 20%), the cell voltage of the battery 410 may drop to a value (e.g., 3.0 V) smaller than a maximum value (e.g., 4.2 V). In such a case, the voltage applied on the processing circuit 420 may be more liable to drop to a value smaller than the threshold due to a sharp increase of the consumption current of the load device 410. Therefore, the electronic device 110 may be specifically designed to avoid the case that the voltage applied on the processing circuit 420 suddenly drops below the threshold value due to a sharp increase of the consumption current. For example, the electronic device 110 may include a resistor and a capacitor connected in the circuit of the electronic device 110 as shown in FIG. 5. The resistor and the capacitor may cause the change of the voltage applied on the processing circuit 420 to lag behind the change of the consumption current of the load device 430. As another example, the electronic device 110 may include a diode and a capacitor connected in the circuit of the electronic device 110 as shown in FIG. 6. The diode and the capacitor may cause the change of the voltage applied on the processing circuit 420 to lag behind the change of the consumption current of the load device 430.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, a protection circuit may be added into the electronic device 110 for protecting the battery 410 from abnormal conditions (e.g., an overcurrent, an over discharge, and/or an overcharge of the battery 410). The protection circuit may share part of the cell voltage when the battery 410 provides the consumption current to the load device 430. As another example, a Bluetooth module may be added to the electronic device 110.

FIG. 5 is a schematic diagram illustrating an exemplary circuit of an electronic device according to some embodiments of the present disclosure. As shown in FIG. 5, the circuit 500 may include a battery 510, a processing circuit 520, a load device 530, a resistor 540, and a capacitor 550.

The battery 510 may be configured to provide a variable current (i.e., a variable consumption current) to drive the load device 530 via one or more wires. The battery 510 may include an internal resistance 512. The battery 510 may have a cell voltage that varies with a capacity percentage of the battery 510. The higher the capacity percentage of the battery 510 is, the higher the cell voltage of the battery 510 may be. More descriptions about the battery 510 may be found in connection with the battery 210 described in FIG. 2 and the descriptions thereof. The one or more wires may also have a resistance as described elsewhere in the disclosure.

The processing circuit 520 may include a voltage detection unit configured to detect a voltage applied on the processing circuit 520. The processing circuit 520 may power off the load device 530 in response to a detection that the voltage applied on the processing circuit 520 is smaller than a threshold value. In some embodiments, the processing circuit 520 and the load device 530 may be connected in parallel. A first end of the resistor 540 may be electrically connected to an input end of the processing circuit 520 and an end of the load device 530. A second end of the resistor 540 may be electrically connected to the capacitor 550. The voltage detection unit 522 may be electrically connected to a point between the resistor 540 and the capacitor 550.

During a discharge process of the battery 510, when a consumption current of the load device 530 maintains stable (e.g., at a first current value, 1 A), the electric potential of point 1 may be equal to the electric potential of point 2. Assuming that a resistance between the voltage detection unit 522 and the ground is large enough and the current flowing through the voltage detection unit 522 is close to zero and, the electric potential of point 3 may also be equal to (or substantially equal to) the electric potential of point 1 or 2. In such a case, the voltage detected by the voltage detection unit 522 may be regarded as the voltage applied on the processing circuit 520.

When the consumption current of the load device 530 increases instantaneously from the first current value to a second current value (e.g., 2 A) higher than the first current value at a first time point, since the circuit 500 includes a consumption resistance (e.g., the internal resistance 512 of the battery 510, and/or a resistance of the wire(s)), a total voltage distributed on the consumption resistance may increase, e.g., from 0.6 V to 1.2 V. As a result, the electric potential of point 1 or 2 may decrease immediately from a first voltage value (e.g., 3.6 V) to a second voltage value (e.g., 3 V). However, due to the presence of the resistor 540 and the capacitor 550, the electric potential of point 3 cannot instantaneously decrease to the second voltage value. At the first time point, the capacitor 550 may serve as a temporary power supply and maintain the electric potential of point 3 at the second voltage value. Then, the capacitor 550 starts to discharge and the electric potential of point 3, i.e., the voltage detected by the voltage detection unit 522, may decrease according to:

$$V(t) = V_0 e^{-\frac{t}{RC}} + V', \quad (2)$$

where V(t) denotes the time-varying electric potential of point 3, $V_0$ denotes the difference between the first voltage value and the second voltage value, V' denotes the second voltage value, R denotes the resistance of the resistor 540, and C denotes the capacitance of the capacitor 550.

That is to say, the decrease of the voltage detected by the voltage detection unit 522 may lag behind the change of the consumption current of the load device 530. For purposes of convenience, the lag time may be defined as a time period required for the electronic potential of point 3 to drop from the first voltage value corresponding to the first current value to a specific voltage value. The specific voltage value may be any value between the first voltage value and the second voltage value, e.g., an average of the first voltage value and the second voltage value, a value approximate to the second voltage value. The lag time may be correlated with the product of the resistance of the resistor 540 and the capacitance of the capacitor 550. For example, the larger the product of the resistance of the resistor 540 and the capacitance of the capacitor 550 is, the larger the lag time may be. In some occasions, by setting the resistance and the capacitance, the lag time may be set as 800 microseconds, 600 microseconds, 400 microseconds, 200 microseconds, 100 microseconds, 80 microseconds, 50 microseconds, 40 microseconds, 30 microseconds, 20 microseconds, 10 microseconds, 5 microseconds etc.

Similarly, when the consumption current of the load device 530 decreases instantaneously from the second current value (i.e., 2 A) to a third current value (e.g., 1.5 A) lower than the second current value at a second time point, the total voltage distributed on the consumption resistance may decrease. As a result, the electric potential of point 1 or 2 may increase immediately from the second voltage value to a third voltage value corresponding to the third current value. An increase of the voltage detected by the voltage detection unit 522 may also lag behind the change of the consumption current of the load device 530. The capacitor 550 may get charged and the electric potential of point 3, i.e., the voltage detected by the voltage detection unit 522, may gradually increase. In such case, at the second time point, the voltage applied on the processing circuit 520 may start to increase before it drops to the second voltage value, which may be below the threshold value, thereby avoiding the power off of the electronic device due to the sudden increase of the consumption current of the electronic device.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the circuit 500 may further include one or more additional components, such as a protection circuit as described in FIG. 2. A resistance may derive from the one or more additional components. As a result, the one or more additional components may share a portion of the cell voltage when the battery 510 provides the consumption current to the load device 530, thereby causing a voltage drop of the voltage applied on the processing circuit 520 when the consumption current of the load device 530 increases sharply.

FIG. 6 is a schematic diagram illustrating an exemplary circuit of an electronic device according to some embodiments of the present disclosure. As shown in FIG. 6, the circuit 600 may include a battery 610, a processing circuit 620, a load device 630, a diode 640, and a capacitor 650.

The battery 610 may include an internal resistance 612 and a cell voltage as described elsewhere in the present disclosure (e.g., FIG. 2 and FIG. 5 and the descriptions thereof). The processing circuit 620 may include a voltage detection unit 622 configured to detect a voltage applied on the processing circuit 620. The processing circuit 620 may power off the load device 630 in response to a detection that the voltage applied on the processing circuit 620 is smaller than a threshold value. The processing circuit 620 and the load device 630 may be connected in parallel. The diode 640 may include a cathode and an anode, which enable a current to pass through the diode 640 primarily in a direction from the anode to the cathode. The anode of the diode 640 may be electrically connected to the load device 630 and/or the battery 610. The cathode of the diode 640 may be electrically connected to the processing circuit 620. As a result, the diode 640 may allow a current to flow from the battery 610 to the processing circuit 620, and may avoid a current that flows from the processing circuit 620 to the load device 630. In some embodiments, the diode 640 may include a PN junction diode, a Schottky diode, a light emitting diode (LED), a Zener diode, a transient voltage suppression (TVS) diode, or the like, or any combination thereof. The capacitor 650 may be electrically connected to the cathode of the diode 640. The processing circuit 620 may be electrically connected to a point between the diode 640 and the capacitor 650 to detect a voltage applied on the processing circuit 620.

During a discharge process of the battery 610, when a consumption current of the load device 630 maintains stable (e.g., at a first current value, 1 A), since the diode 640 has a low resistance (close to zero) in the direction from the anode to the cathode of the diode 640, the electric potential of point 4 may be equal to (or substantially equal to) the electric potential of point 5.

When the consumption current of the load device 630 increases instantaneously from the first current value to a second current value (e.g., 2 A) higher than the first current value at a first time point, since the circuit 600 includes a consumption resistance (e.g., the internal resistance 612 of the battery 610, and/or a resistance of the wire(s)), a total voltage distributed on the consumption resistance may increase, e.g., from 0.6 V to 1.2 V. As a result, the electric potential of point 4 may decrease immediately from a first voltage value (e.g., 3.6 V) to a second voltage value (e.g., 3 V). However, due to the presence of the diode 640 and the capacitor 650, the electric potential of point 5 cannot instantaneously decrease to the second voltage value. At the first time point, the capacitor 650 may serve as a temporary power supply and maintain the electric potential of point 5 at the second voltage value. Then, the capacitor 650 starts to discharge and the electric potential of point 5, i.e., the voltage detected by the voltage detection unit 622, may decrease gradually. That is to say, the decrease of the voltage detected by the voltage detection unit 622 may lag behind the change of the consumption current of the load device 630. The lag time may be correlated with the capacitance of the capacitor 650. For example, the larger the capacitance of the capacitor 650 is, the larger the lag time may be.

Similarly, when the consumption current of the load device 630 decreases instantaneously from the second current value (e.g., 2 A) to a third current value (e.g., 1.5 A) lower than the second current value at a second time point, the total voltage distributed on the consumption resistance may decrease. An increase of the voltage detected by the voltage detection unit 622 may also lag behind the change of the consumption current of the load device 630. The capacitor 650 may get charged and the electric potential of point 5, i.e., the voltage detected by the voltage detection unit 622, may gradually increase. In such case, at the second time point, the voltage applied on the processing circuit 620 may start to increase before it drops to the second voltage value, which may be below the threshold value, thereby avoiding the power off of the electronic device due to the sudden increase of the consumption current of the electronic device.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the circuit 600 may further include one or more additional components, such as a protection circuit as described in FIG. 2. A resistance may derive from the one or more additional components. As a result, the one or more additional components may share a portion of the cell voltage when the battery 610 provides the consumption current to the load device 630, thereby causing a voltage drop of the voltage applied on the processing circuit 620 when the consumption current of the load device 630 increases sharply.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A circuit, comprising:
   a battery configured to provide a current to drive a load device;
   a protection circuit electrically connected to the battery, the protection circuit being configured to protect the battery from an abnormal condition; and
   a processing circuit electrically connected to the battery via a wire, wherein the processing circuit, the load device, and the battery are connected in series, the processing circuit being configured to:
   transmit data signals to the load device;
   detect a voltage applied on the processing circuit; and
   power off the load device in response to a detection that the voltage applied on the processing circuit is smaller than a threshold value, wherein the voltage applied on the processing circuit depends on a cell voltage of the battery, and a voltage drop caused by the current and a resistance deriving from the battery, the protection circuit, and the wire.

2. The circuit of claim 1, wherein the cell voltage of the battery varies with a capacity percentage of the battery.

3. The circuit of claim 1, wherein the resistance deriving from the battery includes a first resistance, wherein the first resistance is less than 200 mΩ.

4. The circuit of claim 3, wherein the resistance deriving from the protection circuit includes a second resistance, wherein the second resistance is within 10 mΩ to 50 mΩ.

5. The circuit of claim 1, wherein the abnormal condition includes at least one of an overcharge of the battery, an over discharge of the battery, or an overcurrent of the battery.

6. The circuit of claim 1, wherein the protection circuit is configured to:

detect a voltage applied on the battery; and in response to that the voltage applied on the battery is lower than a second voltage threshold, disconnect the load device from the battery.

7. The circuit of claim 1, wherein an overcurrent protection point of the protection circuit is associated with a second resistance of the protection circuit, and the overcurrent protection point refers to a current value when the battery powers off the load device.

8. The circuit of claim 1, wherein the threshold is configured such that the load device is powered off due to a sudden increase in a consumption current, and the power off of the load device controlled by the processing circuit occurs before the load device and the battery controlled by the protection circuit are powered off.

9. The circuit of claim 1, wherein the threshold value is 50% to 75% of a maximum voltage of the battery.

10. A circuit, comprising:

a battery configured to provide a variable current to drive a load device; and a processing circuit electrically connected to the battery via a wire, wherein the processing circuit, the load device, and the battery are connected in series, the processing circuit being configured to:

transmit data signals to the load device;

detect a voltage applied on the processing circuit; and power off the load device in response to a detection that the voltage applied on the processing circuit is smaller than a threshold value, wherein the voltage applied on the processing circuit depends on a cell voltage of the battery, and a voltage drop caused by the variable current and a resistance deriving from the battery and the wire, wherein, a change of the voltage applied on the processing circuit lags behind a change of the variable current.

11. The circuit of claim 10, wherein the processing circuit includes a voltage detection unit to detect the voltage applied on the processing circuit, and the circuit further comprises a circuit module consisting of a capacitor and a resistor, wherein:

a first end of the resistor is electrically connected to an input end of the processing circuit and a second end of the resistor is electrically connected to the capacitor;

the voltage detection unit is electrically connected to a point between the resistor and the capacitor; and the circuit module is used to prevent the voltage applied on the processing circuit from suddenly dropping below the threshold value due to a sharp increase in a consumption current of the load device.

12. The circuit of claim 11, wherein a lag time is correlated with a product of a resistance of the resistor and a capacitance of the capacitor.

13. The circuit of claim 12, wherein the lag time is set to prevent the load device from being powered off due to a transient current peak related to the operation of an electroacoustic element, which occurs when the electroacoustic element is driven to change an output level of the electroacoustic element.

14. The circuit of claim 12, wherein the lag time is set as in a range of 10 microseconds to 800 microseconds.

15. The circuit of claim 10, wherein the circuit includes a circuit module consisting of a capacitor, and a diode, wherein:

an anode of the diode is electrically connected to the load device and a cathode of the diode is electrically connected to the processing circuit;

the capacitor is electrically connected to the cathode of the diode;

the processing circuit is electrically connected to a point between the diode and the capacitor to detect the voltage applied on the processing circuit; and the circuit module is used to prevent the voltage applied on the processing circuit from suddenly dropping below the threshold value due to a sharp increase in a consumption current of the load device.

16. The circuit of claim 15, wherein a lag time is correlated with a capacitance of the capacitor.

17. The circuit of claim 10, wherein the load device includes an electroacoustic element.

18. An electronic device comprising a circuit, wherein the circuit includes:

a battery configured to provide a variable current to drive a load device; and a processing circuit electrically connected to the battery via a wire, wherein the processing circuit, the load device, and the battery are connected in series, the processing circuit being configured to:

transmit data signals to the load device;

detect a voltage applied on the processing circuit; and power off the load device in response to a detection that the voltage applied on the processing circuit is smaller than a threshold value, wherein the voltage applied on the processing circuit depends on a cell voltage of the battery, and a voltage drop caused by the variable current and a resistance deriving from the battery and the wire, wherein, a change of the voltage applied on the processing circuit lags behind a change of the variable current.

19. The electronic device of claim 18, wherein the processing circuit includes a voltage detection unit to detect the voltage applied on the processing circuit, and the circuit further comprises a capacitor, and a resistor, wherein:

a first end of the resistor is electrically connected to an input end of the processing circuit and a second end of the resistor is electrically connected to the capacitor; and the voltage detection unit is electrically connected to a point between the resistor and the capacitor.

20. The electronic device of claim 18, wherein the circuit includes a capacitor, and a diode, wherein:

an anode of the diode is electrically connected to the load device and a cathode of the diode is electrically connected to the processing circuit;

the capacitor is electrically connected to the cathode of the diode; and the processing circuit is electrically connected to a point between the diode and the capacitor to detect the voltage applied on the processing circuit.

* * * * *